United States Patent [19]

Schnabel

[11] 4,009,733
[45] Mar. 1, 1977

[54] PRESSURE HOSE

[76] Inventor: Ernst Schnabel, Offheimer Weg 5, 6250 Limburg, Germany

[22] Filed: Aug. 29, 1975

[21] Appl. No.: 609,152

[30] Foreign Application Priority Data

Feb. 18, 1975 Germany .................. 2506874

[52] U.S. Cl. .................. 138/103; 138/109; 138/110; 174/47

[51] Int. Cl.$^2$ ...................... F16L 55/00

[58] Field of Search .......... 138/103, 101, 109, 110, 138/127, 147, 178; 174/47

[56] References Cited

UNITED STATES PATENTS

| | | | |
|---|---|---|---|
| 840,536 | 1/1907 | Weir | 138/109 |
| 1,288,148 | 12/1918 | Oden | 138/127 X |
| 1,970,513 | 8/1934 | Knowland | 138/109 X |
| 2,185,741 | 1/1940 | Sorg et al. | 138/110 X |
| 2,430,921 | 11/1947 | Edelmann | 138/109 X |
| 2,577,049 | 12/1951 | Uline | 138/127 X |
| 2,825,364 | 3/1958 | Cullen et al. | 138/127 X |
| 2,829,671 | 4/1958 | Ernst et al. | 138/127 X |
| 3,109,461 | 11/1963 | Wolff et al. | 138/110 X |
| 3,749,814 | 7/1973 | Pratt | 174/47 |
| 3,796,819 | 3/1974 | Wagner | 174/47 X |
| 3,831,635 | 8/1974 | Burton | 138/110 |

FOREIGN PATENTS OR APPLICATIONS 357,098  11/1961  Switzerland ................ 174/47

*Primary Examiner*—Henry K. Artis
*Attorney, Agent, or Firm*—Michael J. Striker

[57] ABSTRACT

A hose member of synthetic plastic material is surrounded by a pressure-resistant armor and is provided at its opposite ends with mounting sleeves which surround the armor. At least one of the ends of the hose member extends axially beyond the associated mounting sleeve. Two connecting members are provided at the opposite ends, each having a nipple which extends into the hose member and which is formed with an externally enforcing bead surrounded by an axially intermediate portion of the respectively associated mounting sleeve. The nipples are retained against axial movement relative to the hose member by a retaining portion.

10 Claims, 2 Drawing Figures

U.S. Patent    Mar. 1, 1977    4,009,733
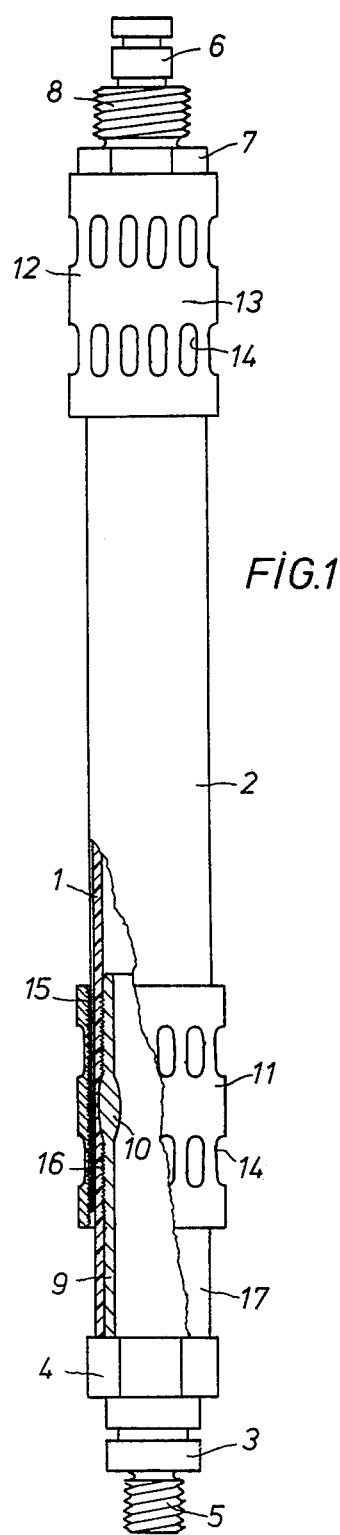
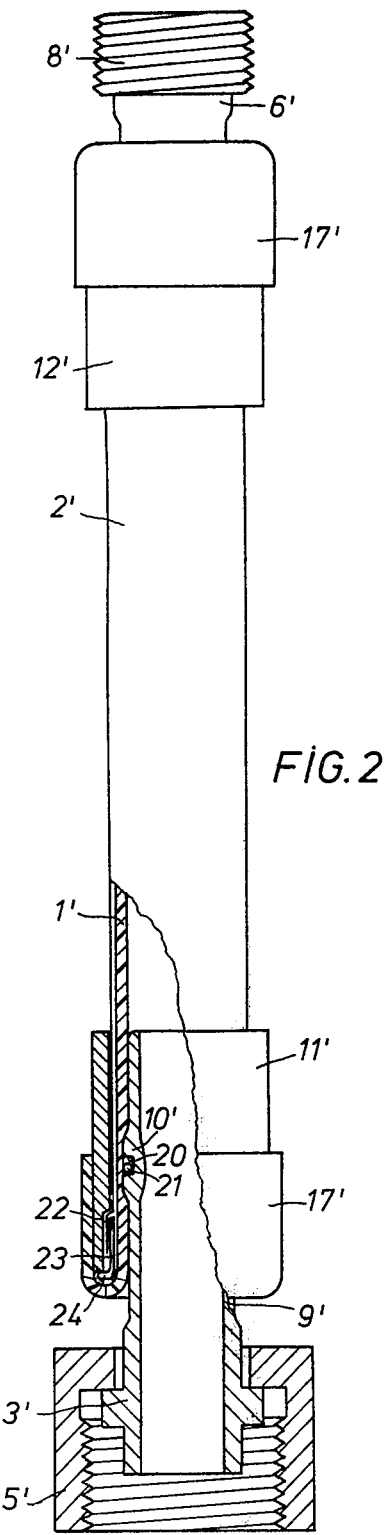

PRESSURE HOSE

BACKGROUND OF THE INVENTION

The present invention relates to a pressure hose, and more particularly to a pressure hose which is advantageously — but not excessively — suitable for use in carrying the cooling water for the rotor of a generator.

Pressure hoses for many applications are already well known in the art.

One of these applications requires the use of pressure hoses for supplying cooling water to the cooling channels of stator windings in water-cooled generators. Hoses employed for such purposes can be required to withstand an internal pressure of 15 atmospheres or even higher.

Problems are, however, encountered if in a generator it is not merely the stator which is to be water-cooled, but also the rotor. In many applications the rotors are cooled with air or gas, but it is desirable to use water as a cooling medium for the rotor also. Due to the rotation of the rotor, however, high centrifugal forces develop which cause very high pressures in the hoses that conduct the cooling water in such applications. This means that in a large generator the cooling water hose may be subjected to pressures on the order of 160 atmospheres or even higher. The pressure hoses which are known from the prior art are not capable of withstanding such pressures, being suitable only for pressures to a level of approximately 30 atmospheres. It has been proposed to armor and reinforce these known synthetic plastic hoses with metallic reinforcements to make them more resistant to internal pressures. However, it was found that even this measure could not solve the problem because in the type of application which has been outlined above it is necessary not only that the hoses be able to withstand the pressure, but also that sufficient electrical insulation be present. The metallic armor, however, while serving as a reinforcement, also constituted an electrical conductor extending between the opposite axial ends of the inherently non-conductive hose and was therefore not acceptable.

SUMMARY OF THE INVENTION

Accordingly, it is a general object of the present invention to overcome the disadvantages of the prior art.

More particularly, it is an object of the present invention to provide an improved pressure hose which is capable of withstanding high and very high internal pressures.

Another object of the invention is to provide such an improved pressure hose which is particularly well suitable for carrying the cooling water for the rotor of a generator and which for this purpose has its axial end portions electrically insulated from one another.

In keeping with these objects and others which will become apparent hereafter, one feature of the invention resides in a pressure hose, particularly for carrying the cooling water for the rotor of a generator, which comprises a hose member of elastomeric material, a pressure-resistant armor surrounding said hose member, mounting sleeves surrounding the armor in the region of the opposite ends of the hose member, at least one of the ends projecting axially beyond the associated mounting sleeve, and two connecting members at the opposite ends and each having a nipple extending into the hose member at the respective end. Each of the nipples is formed with an external reinforcing bead which is surrounded by an axially intermediate portion of the respectively associated mounting sleeve.

Tests conducted with a hose constructed according to the present invention have shown that this hose is capable of withstanding internal pressures of even 300 atmospheres and to remain absolutely tight. Due to the fact that at least one end portion of the hose extends beyond the associated mounting sleeve and constitutes an electrically insulating part of the hose, the desired electrical insulation is guaranteed, thus making it possible to use the hose of the present invention in the cooling of rotors of the electrical generators. The hose of the present invention can be constructed quite simply and inexpensively.

It is advantageous if, according to a further concept of the invention, the end portion of the hose which projects outwardly beyond the associated mounting sleeve, or the two end portions which project each beyond the respectively associated mounting sleeve, is deformed so as to be folded back upon the respectively associated mounting sleeve. Such a construction provides the desired effective electrical insulation between the opposite ends of the hose but permits an axially more compact construction.

The nipples are advantageously provided at opposite axial sides of the respective bead with grooves or the like at their exterior and the connecting members may be provided with similar grooves in the interior, the grooves being separated by projections that extend into grooves of the nipples, and vice versa. This prevents axial displacement of the nipples relative to the hose member.

In some applications it may be advantageous if the nipples are provided with external circumferential grooves, at least one each, in which an O-ring is arranged. This provides an even further improved seal, even under very high operating pressures. However, it has been found that even in the absence of such O-rings, a sufficiently good seal can be obtained between the beads and the hose member of elastomeric material. The elastomeric material may be synthetic or natural rubber, or it may be a synthetic plastic material, such as polytetrafluoroethylene.

The armor is advantageously in form of a metallic wire braid and at the opposite ends of the hose a protective annular member may be located between the wire braid and the hose member itself for the purpose of preventing the wires from penetrating into the material of the hose member and damaging the same.

The annular members may also be provided with an abutment against which the respective mounting sleeve may abut, thus providing an automatic guide for the proper relative positioning of these components during the assembly of the hose. Furthermore, if the construction is of the type in which the axially outwardly projecting end or ends of the hose are folded back upon the mounting sleeves, the mounting sleeves are then fixed in this position against undesired displacement.

It is further advantageous if the armor extends axially beyond the location of the respective beads and if the mounting sleeves are provided in their inner circumference adjacent to their axially outer ends with recesses corresponding to the length and wall thickness of the protective annular members, in which these members are received. This makes it possible for the members to be installed in a particularly simple manner and yet in a precisely predetermined position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a plan view partly broken away, illustrating a first embodiment of the invention; and FIG. 2 is a view similar to FIG. 1, illustrating a second embodiment of the invention.

DESCRIPTION OF THE PREFERRED EMBODIMENTS

Referring now to the drawing in detail, and discussing firstly the embodiment illustrated in FIG. 1, it will be seen that the pressure hose illustrated in this figure has a tubular hose member 1 which in the illustrated embodiment may be of polytetrafluoroethylene but could also be of another elastomeric material as outlined above. The central portion of the hose member 1 is surrounded by a tubular armor 2 of braided steel wire. At one of the opposite axial ends of the hose member 1 there is provided a metallic connecting member 3 having a portion 4 of hexagonal outline and a threaded portion 5. At the other axial end a similar connecting member 6 having a portion 7 of hexagonal outline and a threaded portion 8 is provided. The connecting members 3 and 6 each have a nipple 9 which is pushed into the hose member 1 and provided with an external bead 10 of annular circumferentially extending configuration.

The connecting members 3 and 6 are secured to the hose member 1 by means of two mounting sleeves 11 and 12, respectively. These surround portions of the hose member 1 and each have an axially intermediate central portion 13 that surrounds the respective bead 10 of the connecting member 3 or 6, respectively. The sleeves 11 and 12 are provided retaining portions located at opposite axial sides of the central portion 13 with circumferentially spaced radial depressions 14, and the inner circumference of the sleeves 11 and 12 is provided at additional retaining portions with circumferentially extending grooves 15 which are juxtaposed with appropriate grooves 16 located at opposite axial sides of the respective beads 10 on the nipples 9. Of course, between adjacent grooves 15 and between adjacent grooves 16 there are provided ribs which extend circumferentially.

In FIG. 1 only one end portion 17 of the hose member 1 projects axially beyond the associated member 11 to form a insulating part of predetermined length between the member 11 and the portion 4 of hexagonal configuration of the member 3. The nipple of the member 3 is correspondingly longer than the nipple 9 of the member 6, but the armor 2 terminates beneath the members 11 and 12 with slight spacing from the axially outermost ends thereof.

The hose in FIG. 2 is quite analogous to that of FIG. 1, and like reference numerals identify like elements but are provided with a prime symbol. The member 3' is provided with a loose threaded portion 5' which has an internal thread instead of the external thread in the embodiment of FIG. 1. The member 6' is provided with a portion 8' which has an external thread.

The embodiment in FIG. 2 differs from that of FIG. 1 primarily in the fact that both axial ends of the hose member project beyond the respectively associated mounting sleeve.

In particular, the end 17' of the hose member, which is exposed, is bent over onto the mounting sleeve 11', and the opposite end 17' is also bent over upon the mounting sleeve 12'. Thus, the construction of the pressure hose in FIG. 2 is symmetrical and the nipples 9' here have identical lengths. The nipples 9' are provided in the regions of their respective beads 10' with an external circumferential groove 20 in which a respective O-ring 21 is received.

In addition, in the embodiment of FIG. 2 the mounting sleeves 11' and 12' are provided on the inner circumference, adjacent their respective axially outer end portions, with recesses 22 each of which receives an annular protective member 23 which has a flange-like abutment 24 that engages a corresponding shoulder adjacent the axially outermost end of the respective sleeve 11' or 12'. The protective sleeves 23 are of metallic material and separate the steel wire ends of the braided armor 2' from the hose member 1', thus preventing damage to the elastomeric material of the hose member 1' by penetration thereinto of the ends of the steel wire of which the braided armor 2' is composed.

It will be understood that each of the elements described above, or two or more together, may also find a useful application in other types of constructions differing from the types described above.

While the invention has been illustrated and described as embodied in a pressure hose, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure hose, particularly for carrying the cooling water for the rotor of a generator, comprising an elongated hose member of electrically insulating elastomeric material and having longitudinally spaced ends; a pressure-resistant armor of electrically conductive material and surrounding said hose member; two connecting members each at one of said ends of said hose member and each having a nipple extending into said hose member at the respective end and being formed with an external reinforcing bead; mounting sleeves surrounding said armor at said ends of said hose member and each having a longitudinally intermediate portion which surrounds said bead of the respective associated nipple; and means for electrically insulating said armor from at least one of said connecting members, including a respective end portion of said hose member which extends longitudinally beyond the respective mounting sleeve and is interposed between said armor and said one connecting member.

2. A pressure hose as defined in claim 1, wherein said elastomeric material is a synthetic plastic material.

3. A pressure hose as defined in claim 2, wherein said elastomeric material is polytetrafluoroethylene.

4. A pressure hose as defined in claim 1, wherein said connecting members are of metallic material.

5. A pressure hose as defined in claim 1, wherein said respective end portion is deformed to externally surround a portion of the associated mounting sleeve.

6. A pressure hose as defined in claim 1, wherein said nipples are provided with first retaining portions at opposite axial sides of the respective beads, and said mounting sleeves are provided with mating second retaining portions positioned for cooperative juxtaposition with said first retaining portions.

7. A pressure hose as defined in claim 1, wherein each bead is formed with an outer circumferential groove; and further comprising an O-ring located in the respective groove.

8. A pressure hose as defined in claim 1, wherein said armor is a tubular metallic braided sleeve and includes two protective annular members each located between said braided sleeve and said hose member.

9. A pressure hose as defined in claim 8, wherein each of said mounting sleeve is provided with an abutment against which an axial end face of the respectively associated annular member abuts.

10. A pressure hose as defined in claim 8, wherein said armor overlays the respective beads, and said mounting sleeves are formed adjacent their axially outermost ends with inner circumferential recesses dimensioned to receive the respective annular members therein.

* * * * *